(12) United States Patent
Haraguchi (10) Patent No.: US 6,965,414 B2
(45) Date of Patent: Nov. 15, 2005

(54) APPARATUS FOR DETECTING TELECINE CONVERSION METHOD OF VIDEO SIGNAL

(75) Inventor: Toshiaki Haraguchi, Yamanashi (JP)

(73) Assignees: Pioneer Corporation, Tokyo (JP); Pioneer Micro Technology Corporation, Yamanashi (JP)

(*) Notice: Subject to any disclaimer, the term of this patent is extended or adjusted under 35 U.S.C. 154(b) by 609 days.

(21) Appl. No.: 10/201,923

(22) Filed: Jul. 25, 2002

(65) Prior Publication Data

US 2003/0115590 A1 Jun. 19, 2003

(30) Foreign Application Priority Data

Aug. 31, 2001 (JP) ........................................ 2001-263818

(51) Int. Cl.[7] ................................................ H04N 7/01
(52) U.S. Cl. ........................ 348/441; 348/459; 348/911; 348/97
(58) Field of Search ................................ 348/441, 443, 348/4, 447, 448, 449, 451, 452, 455, 456, 458, 459, 97, 911; H04N 7/01, 11/20

(56) References Cited

U.S. PATENT DOCUMENTS

| | | | | |
|---|---|---|---|---|
| 5,461,420 A | * | 10/1995 | Yonemitsu et al. | 375/240.15 |
| 5,563,651 A | * | 10/1996 | Christopher et al. | 348/97 |
| 5,844,618 A | * | 12/1998 | Horiike et al. | 348/441 |
| 5,892,550 A | * | 4/1999 | Iwasaki et al. | 348/443 |
| 6,014,182 A | * | 1/2000 | Swartz | 348/700 |
| 6,058,140 A | * | 5/2000 | Smolenski | 375/240.16 |
| 6,144,410 A | * | 11/2000 | Kikuchi et al. | 348/441 |
| 6,509,933 B1 | * | 1/2003 | Honda | 348/558 |
| 6,559,890 B1 | * | 5/2003 | Holland et al. | 348/441 |
| 6,580,463 B2 | * | 6/2003 | Swartz | 348/558 |
| 6,839,089 B2 | * | 1/2005 | Fakhruddin | 348/459 |
| 6,839,094 B2 | * | 1/2005 | Tang et al. | 348/607 |

* cited by examiner

Primary Examiner—Paulos M. Natnael
(74) Attorney, Agent, or Firm—Morgan, Lewis & Bockius LLP

(57) ABSTRACT

A telecine conversion method detecting apparatus which determines that an input video signal is a telecine converted video signal generated from a movie film in accordance with a 2-3 pull-down method when detecting that an inter-frame difference accumulated value of a current field of the input video signal is equal to or less than a threshold value for still field determination, that each inter-frame difference accumulated value of four fields preceding the current field is equal to or greater than a threshold value for motion field determination, and that the inter-frame difference accumulated value of the current field is less than each corrected value calculated by multiplying each of the inter-frame difference accumulated values of the four preceding fields by a predetermined coefficient.

4 Claims, 9 Drawing Sheets

APPARATUS FOR DETECTING TELECINE CONVERSION METHOD OF VIDEO SIGNAL

BACKGROUND OF THE INVENTION

1. Field of the Invention

The present invention relates to a telecine conversion method detecting apparatus for detecting, in a movie film, whether or not an input video signal is a telecine converted video signal generated in accordance with a 2-3 pull-down method, a 2-2 pull-down method, and the like.

2. Description of the Related Background Art

Video signals of standard television systems such as the NTSC system often include video signals based on movie films. A movie film is shown at a rate of 24 frames per second, while a video signal of the standard television system is an interlaced video signal broadcast at a rate of 60 fields per second. Therefore, a movie film is converted to a telecine format based on a 2-3 pull-down method to provide a video signal compatible with the standard television system.

In the 2-3 pull-down method, first, a movie film is scanned to generate a sequentially scanned video signal having a frame frequency of 24 Hz. For example, a first frame of the movie film is converted to a first and a second field of the video signal; a second frame to a third through a fifth field; a third frame to a sixth and a seventh field; and a fourth frame to an eighth through a tenth field. The last fields (the fifth field and tenth field) in the conversion of one frame to three fields are fields having the same video contents as the first fields (the third field and eighth field).

In the 2-3 pull-down method, every two frames of a movie film, five fields of a video signal of the standard television system are formed. The frames of the movie film are converted to the video signal which alternately repeats two fields of the video signal and three fields of the video signal.

When the conversion is performed in the foregoing manner, for example, the third field and fifth field, and the eighth field and tenth field are the same video signals, respectively, so that an inter-frame difference between the fifth and tenth fields decreases. Such a relationship occurs every fifth field.

Specifically, an absolute value of an inter-frame difference is accumulated in one field period, the accumulated value is compared with a predetermined threshold value, and a motion field is determined when the accumulated value is larger than the threshold value while a still field is determined when equal to or less than the threshold value. Thus, the still field is determined every fifth field in a video signal converted in accordance with the 2-3 pull-down method. The still field is detected to discriminate an image converted in accordance with the 2-3 pull-down method from a general image.

However, the aforementioned detecting method accumulates an absolute value of an inter-frame difference for one field period and compares the accumulated value with a predetermined threshold over a plurality of fields to detect a periodic pattern of a telecine converted image, so that inter-frame difference increases, for example, if noise is included in a video signal, possibly causing the detecting method to erroneously determine a motion field, even though it is a still field.

If an input video signal is erroneously detected in regard to the telecine conversion method, the video signal is processed as a general image though it is a telecine image, resulting in a degraded quality of the displayed image.

SUMMARY OF THE INVENTION

The present invention has been made in view of the foregoing circumstance, and it is an object of the invention to provide a telecine conversion method detecting apparatus which is capable of stably and accurately detecting a telecine conversion method of an input video signal.

A telecine conversion method detecting apparatus according to the present invention comprises an inter-frame calculator for accumulating an absolute value of an inter-frame difference signal for image components in a predetermined area of each field of an input video signal in each field to calculate an inter-frame difference accumulated value; an inter-frame holder for holding the inter-frame difference accumulated value of a current field output from the inter-frame calculator to output inter-frame difference accumulated values of four fields preceding the inter-frame difference accumulated value of the current field; a first detector for detecting that the inter-frame difference accumulated value of the current field is equal to or less than a first still threshold value for still field determination, that each of the inter-frame difference accumulated values of the four preceding fields is equal to or greater than a first motion threshold value for motion field determination that is greater than the first still threshold value, and that the inter-frame difference accumulated value of the current field is less than each corrected value calculated by multiplying each of the inter-frame difference accumulated values of the four preceding fields by a first predetermined coefficient, to generate a first detection signal; and a first determining device for determining in response to the first detection signal that the input video signal is a telecine converted video signal generated from a movie film based on a 2-3 pull-down method.

A telecine conversion method detecting apparatus according to the present invention comprises an inter-field calculator for performing intra-field interpolation processing every field of a video signal one field before an input video signal to generate an interpolated video signal, and accumulating an absolute value of an inter-field difference signal every field for image components within a predetermined area in accordance with a difference between the input video signal and the interpolated video signal to calculate an inter-field difference accumulated value; an inter-field holder for holding an inter-field difference accumulated value of a current field output from the inter-field calculator to output an inter-field difference accumulated value of a previous field preceding the inter-field difference accumulated value of the current field; a first detector for detecting that the inter-frame difference accumulated value of the previous field is equal to or greater than a motion threshold value for motion field determination, that the inter-frame difference accumulated value of the current field is equal to or less than a still threshold value for still field determination, and that the inter-frame difference accumulated value of the current field is less than a corrected value calculated by multiplying the inter-field difference accumulated value of the previous field by a predetermined coefficient, to generate a first detection signal; and a first determining device for determining that the input video signal is a telecine converted video signal generated from a movie film based on a 2-2 pull-down method in response to the first detection signal.

DETAILED DESCRIPTION OF THE PREFERRED EMBODIMENTS

In the following, an embodiment of the present invention will be described in detail with reference to the drawings.

Figure 1:
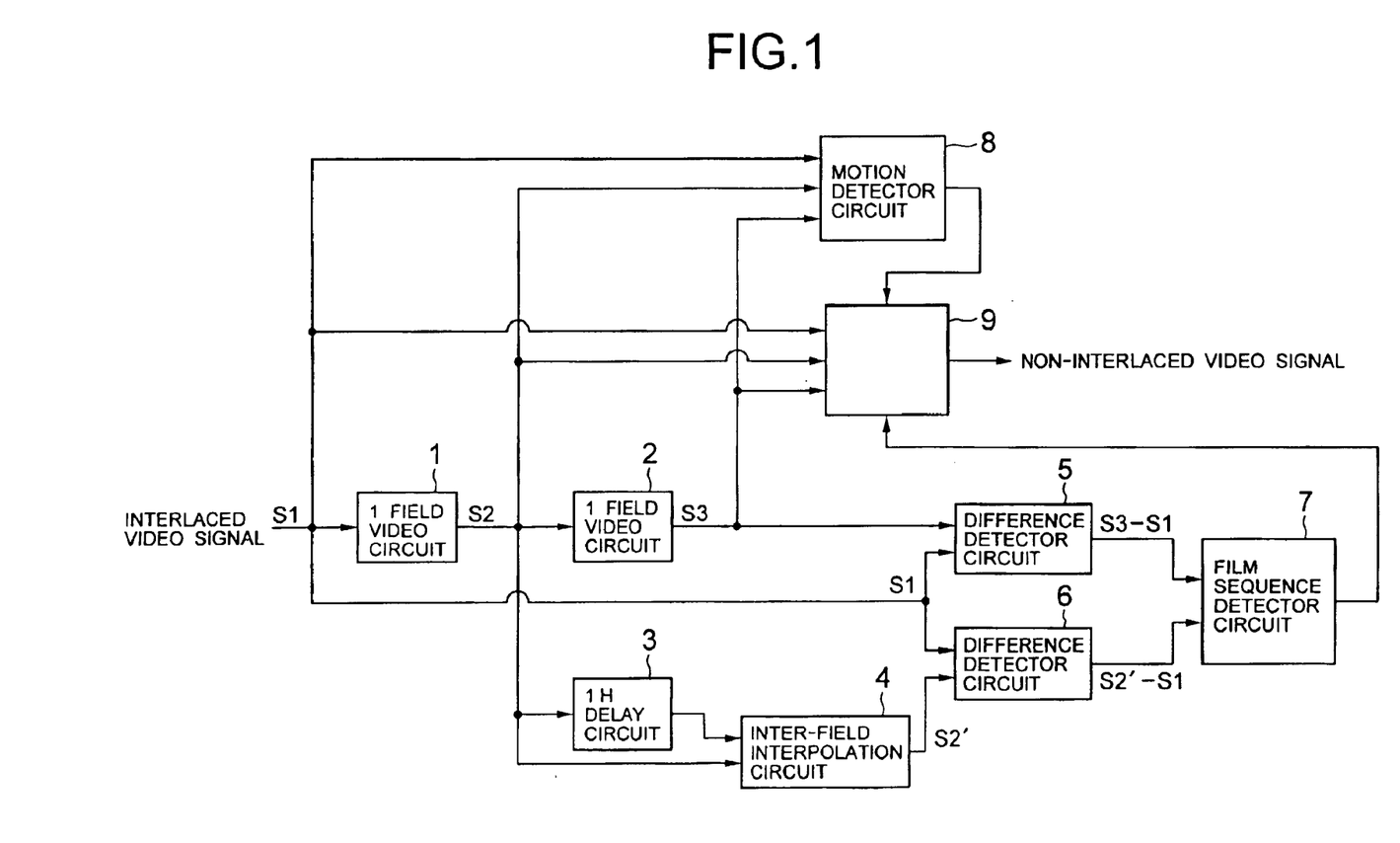
FIG. 1 is a block diagram showing the configuration of a telecine conversion method detecting apparatus according to the present invention.

FIG. 1 shows a telecine conversion method detecting apparatus according to the present invention. This detecting apparatus comprises one-field delay circuits 1, 2; a 1H delay circuit 3; an intra-field interpolation circuit 4; difference detector circuits 5, 6; a film sequence detector circuit 7; a motion detector circuit 8; and a sequential scan converter circuit 9.

The one-field delay circuit 1 is supplied with an interlaced input video signal S1, and delays the video signal by a time corresponding to one field and outputs the delayed video signal to the one-field delay circuit 2, 1H delay circuit 3, intra-field interpolation circuit 4, motion detector circuit 8, and sequential scan converter circuit 9. The one-field delay circuit 2, which is connected to the output of the one-field delay circuit 1, delays a video signal S2 output from the one-field delay circuit 1 by a time corresponding to one field and supplies the delayed video signal to the difference detector circuit 5, motion detector circuit 8 and sequential scan converter circuit 9. The one-field delay circuit 2 outputs a video signal S3.

The 1H delay circuit 3, which is connected to the output of the one-field delay circuit 1, delays the video signal S2 output from the one-field delay circuit 1 by one horizontal scanning period, and supplies the delayed video signal to the intra-field interpolation circuit 4.

The intra-field interpolation circuit 4, for example, averages the video signal S2 output from the one-field delay circuit 1 and the video signal output from 1H delay circuit 3 to generate and output a video signal S2' corresponding to a horizontal scanning line position of a current field of the input video signal S1.

The difference detector circuit 5 outputs a difference S3–S1 between the video signal S3 delayed by one frame, output from the one-field delay circuit 2, and the input video signal S1 as an inter-frame difference.

The difference detector circuit 6 outputs a difference S2'–S1 between the output video signal S2' of the intra-field interpolation circuit 4 and the input video signal S1 as an inter-field difference.

The film sequence detector circuit 7 is connected to the output of each difference detector circuit 5, 6. The film sequence detector circuit 7 determines in accordance with the output signals of the difference detector circuits 5, 6 that the input video signal S1 is a video signal other than a video signal of the standard television system. The film sequence detector circuit 7 generates a 2-3 sequence detection signal when determining that the input video signal S1 is a video signal of the 2-3 pull-down method; generates a 2-3 out-of-sequence detection signal when determining that the input video signal S1 is not a video signal of the 2-3 pull-down method; generates a 2-2 sequence detection signal when determining that the input video signal S1 is a video signal of the 2-2 pull-down method; and generates a 2-2 out-of-sequence detection signal when determining that the input video signal S1 is not a video signal in the 2-2 pull-down method. The output signal of the film sequence detector circuit 7 is supplied to the sequential scan converter circuit 9 as a control signal. The specific configuration of the film sequence detector circuit 7 will be described later.

The motion detector circuit 8 detects that a motion is included in an image represented by the input video signal S1 in accordance with the input video signal S1, the video signal S2 output from the one-field delay circuit 1, and the video signal S3 output from the one-field delay circuit 2. A detection signal of the motion detector circuit 8 is supplied to the sequential scan converter circuit 9.

The sequential scan converter circuit 9 outputs a non-interlaced video signal corresponding to the input video signal S1 in accordance with the input video signal S1, video signal S2, video signal S3, control signal from the film sequence detector circuit 7, and detection signal of the motion detector circuit 8.

Figure 2:
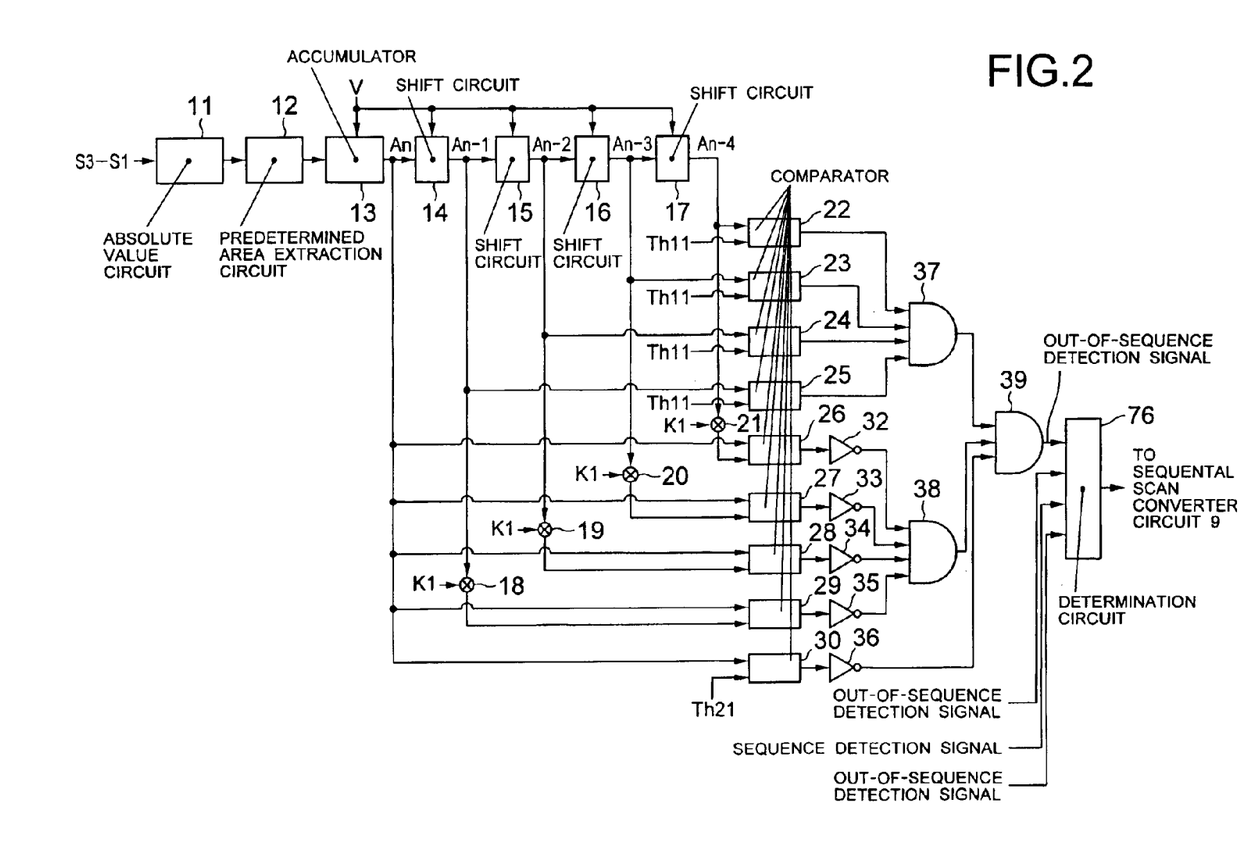
FIG. 2 is a block diagram showing the specific configuration of a film sequence detector circuit.
Figure 3:
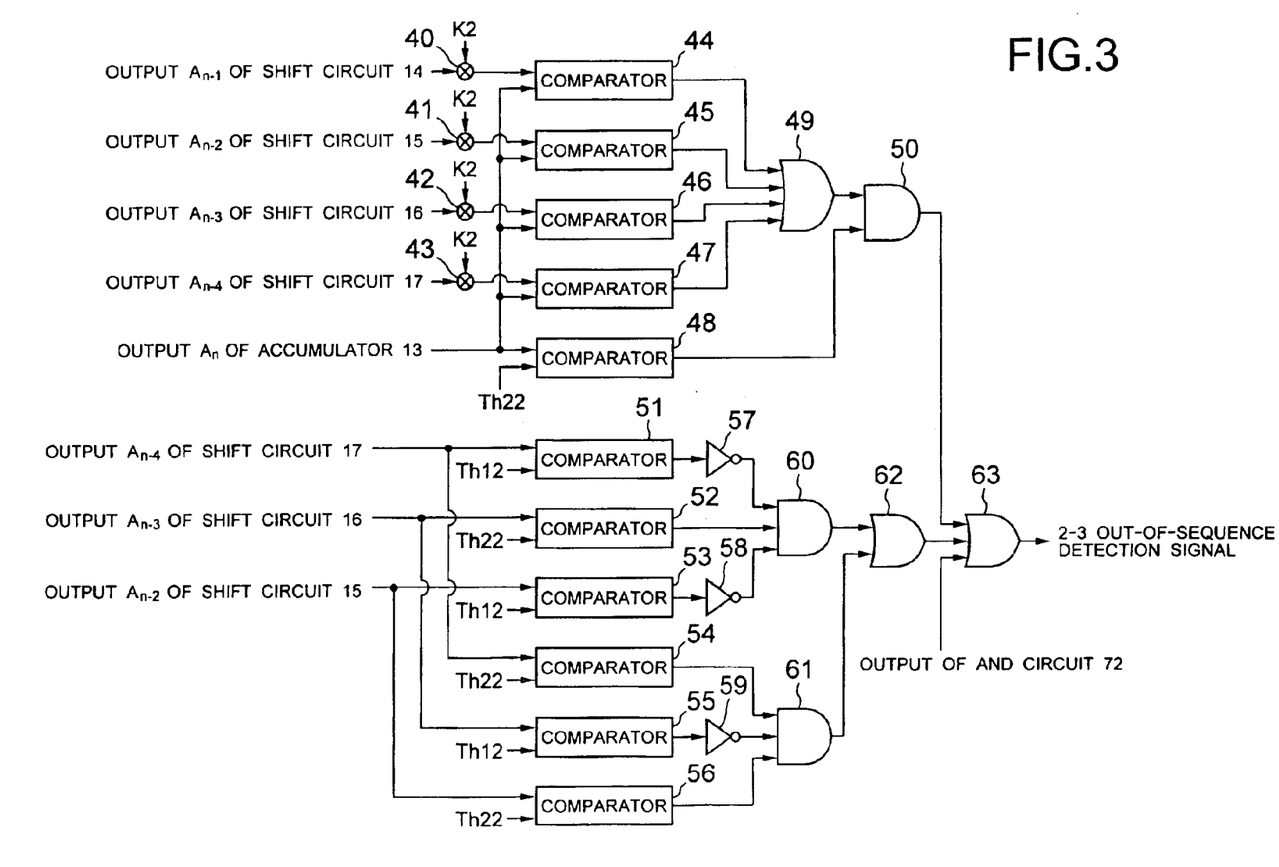
FIG. 3 is a block diagram showing the specific configuration of the film sequence detector circuit.
Figure 4:
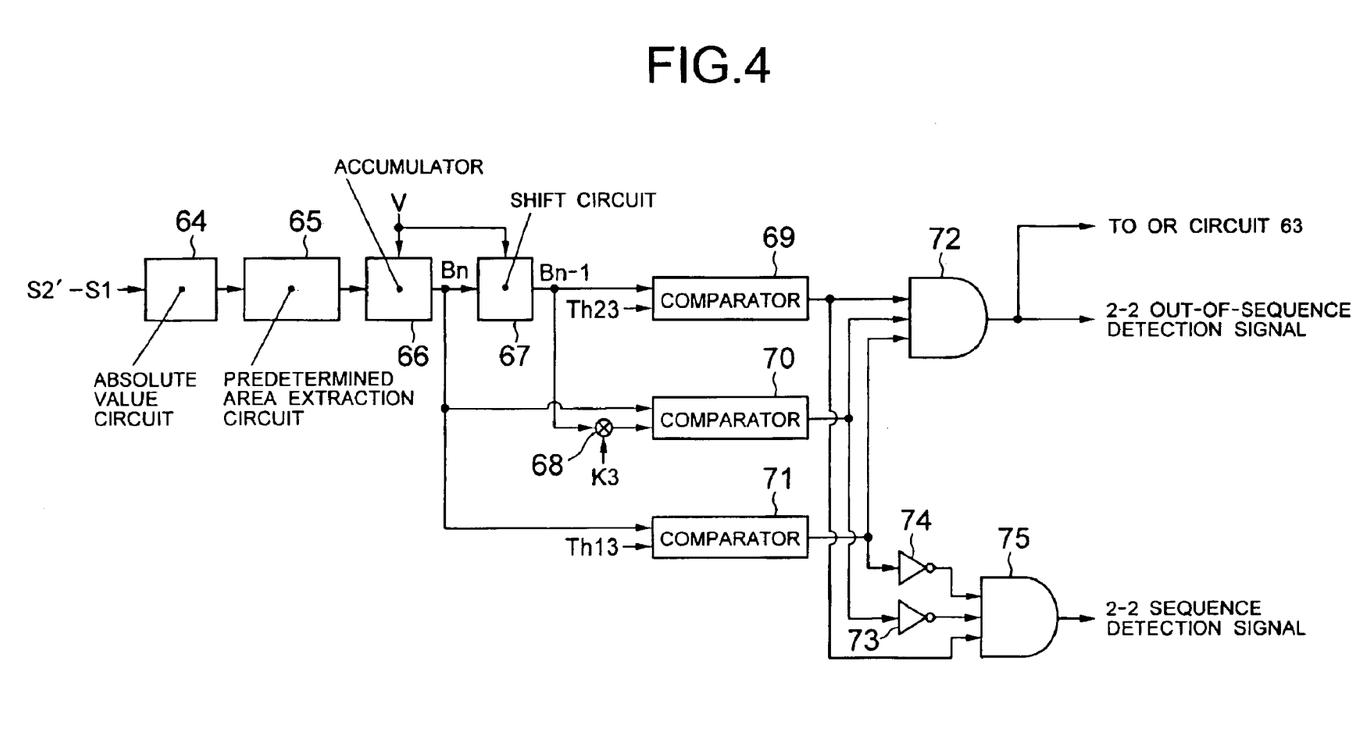
FIG. 4 is a block diagram showing the specific configuration of the film sequence detector circuit.

FIGS. 2–4 show the specific configuration of the film sequence detector circuit 7. The film sequence detector circuit 7 comprises absolute value circuits 11, 64; predetermined area extraction circuits 12, 65; accumulators 13, 66; shift circuits 14–17, 67; coefficient multipliers 18–21, 40–43, 68; comparators 22–30, 44–48, 51–56, 69–71; NOT circuits 32–36, 57–59, 73, 74; AND circuits 37–39, 50, 60, 61, 72, 75; OR circuits 49, 62, 63; and a determination circuit 76.

Figure 5:
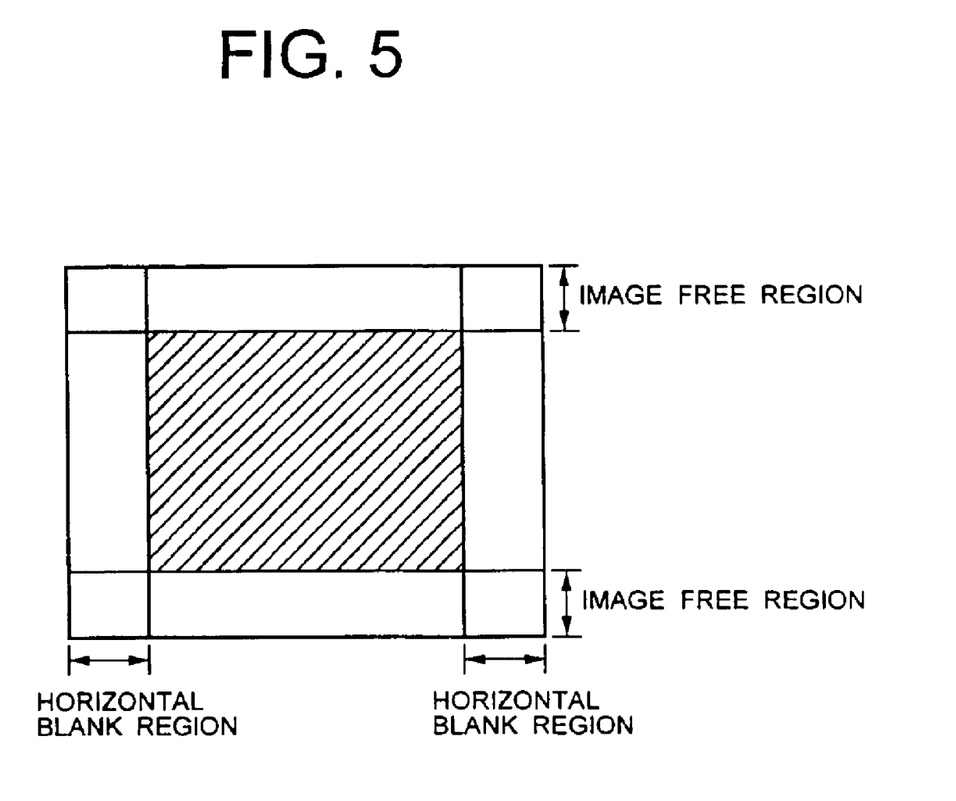
FIG. 5 is a diagram showing a predetermined region of a screen.

The absolute value circuit 11 is supplied with the inter-frame difference S3–S1 from the difference detector circuit 5. The absolute value circuit 11 takes an absolute value of the inter-frame difference S3–S1, and supplies the absolute value to the predetermined area extraction circuit 12. The predetermined area extraction circuit 12 extracts only an absolute value of the inter-frame difference S3–S1 (corresponding to a video signal within a predetermined area. Some video signals include image-free regions in upper and lower portions of a screen such as a vista size video, so that an erroneous determination may be made if a film sequence is determined based on the inter-frame difference including the image-free regions. To prevent such an erroneous determination, the predetermined area extraction circuit 12 is provided for using only an inter-frame difference in a valid image region at the center of the screen (hatched portion in FIG. 5), i.e., the predetermined area, avoiding the image-free regions and a horizontal blank region as shown in FIG. 5.

The accumulator 13 accumulates the absolute value of the inter-frame difference S3–S1 extracted by the predetermined area extraction circuit 12 each time a vertical synchronization signal V is generated. In other words, the accumulator 13 accumulates the absolute value in units of one-field periods. The shift circuits 14–17 are connected in series to the output of the accumulator 13. Each of the shift circuits 14–17 newly holds and outputs an input signal in response to the vertical synchronization signal V. Thus, the shift circuit 14 holds and outputs an output value of the accumulator 13 one field before the current output value of the accumulator 13; the shift circuit 15 holds and outputs an output value of the accumulator 13 two fields before the current output value of the accumulator 13; the shift circuit 16 holds and outputs an output value of the accumulator 13 three fields before the current output value of the accumulator 13; and the shift circuit 17 holds and outputs an output value of the accumulator 13 four fields before the current output value of the accumulator 13.

The output of the accumulator 13 is connected to one input of each of the comparators 26–30. The output of the shift circuit 14 is directly connected to one input of the comparator 25, and connected to the other input of the comparator 29 through the coefficient multiplier 18. The output of the shift circuit 15 is directly connected to one input of the comparator 24, and connected to the other input of the comparator 28 through the coefficient multiplier 19. The output of the shift circuit 16 is directly connected to one input of the comparator 23, and connected to the other input of the comparator 27 through the coefficient multiplier 20. The output of the shift circuit 17 is directly connected to one input of the comparator 22, and connected to the other input of the comparator 26 through the coefficient multiplier 21. The coefficient multipliers 18–21 multiply output values of the shift circuits 14–17 by a coefficient K1. The other input of each comparator 22–25 is supplied with a threshold value Th11 for motion field determination. The other input of the comparator 30 is supplied with a threshold value Th21 for still field determination.

The comparators 22–25 compare each of values $A_{n-1}$ one field before to $A_{n-4}$ four fields before of the accumulated absolute value of the inter-frame difference S3–S1 within the predetermined area with the threshold value Th11 for motion field determination. The comparators 26–29 compare each of values $K1 \cdot A_{n-1} - K1 \cdot A_{n-4}$ derived by multiplying the values $A_{n-1}$ one field before to $A_{n-4}$ four fields before of the accumulated absolute value of the inter-frame difference S3–S1 within the predetermined area by the coefficient K1 with a current field value $A_n$ of the accumulated absolute value of the inter-frame difference S3–S1 within the predetermined area. The comparator 30 compares the current field value $A_n$ of the accumulated absolute value of the inter-frame difference S3–S1 within the predetermined area with the threshold value Th21 for still field determination. The NOT circuits 32–36 are connected to respective outputs of the comparators 26–30 to invert logical output values of the comparators 26–30.

The AND circuit 37 takes a logical AND of the respective logical output values of the comparators 22–25. The AND circuit 38 takes a logical AND of respective logical output values of the NOT circuits 32–35. The AND circuit 39 takes a logical AND of respective logical output values of the AND circuit 37, 38 and NOT circuit 36. When the result of the logical AND is at high level indicative of "1," this serves as a 2-3 sequence detection signal.

The output of the accumulator 13 is connected to one input of each of the comparators 44–47. The output of the shift circuit 14 is connected to the other input of the comparator 44 through the coefficient multiplier 40. The output of the shift circuit 15 is connected to the other input of the comparator 45 through the coefficient multiplier 41. The output of the shift circuit 16 is connected to the other input of the comparator 46 through the coefficient multiplier 42. The output of the shift circuit 17 is connected to the other input of the comparator 47 through the coefficient multiplier 43. The coefficient multipliers 40–43 multiply output values of the shift circuits 14–17 by a coefficient K2. The comparators 44–47 compare values $K2 \cdot A_{n-1} - K2 \cdot A_{n-4}$ derived by multiplying the values $A_{n-1}$ one field before to $A_{n-4}$ four fields before of the accumulated absolute value of the inter-frame difference S3–S1 within the predetermined area by the coefficient K2 with the current field value $A_n$ of the accumulated absolute value of the inter-frame difference S3–S1 within the predetermined area.

The output of the accumulator 13 is connected to one input of the comparator 48, and the other input is supplied with the threshold value Th22 for motion field determination. The comparator 48 compares the current field value $A_n$ of the accumulated absolute value of the inter-frame difference S3–S1 within the predetermined area with the threshold value Th22 for motion field determination.

The OR circuit 49 takes a logical OR of respective output values of the comparators 44–47. The AND circuit 50 takes a logical AND of an output value of the OR circuit 49 with an output value of the comparator 48. An output value of the AND circuit 50 is supplied, to the OR circuit 63.

The output of the shift circuit 17 is connected to one input of each of the comparators 51, 54; the output of the sift circuit 16 is connected to one input of each of he comparators 52, 55; and the output of the shift circuit 15 is connected to one input of each of the comparators 53, 56. The other input of each of the comparators 51, 53, 55 is supplied with the threshold value Th12 for still field determination, while the other input of each of the comparators 52, 54, 56 is supplied with the threshold value Th22 for motion field determination.

The comparator 51 compares the value $A_{n-4}$ of the accumulated absolute value of the inter-frame difference S3–S1 within the predetermined area four fields before with the threshold value Th12 for still field determination. The comparator 52 compares the value $A_{n-3}$ of the accumulated absolute value of the inter-frame difference S3–S1 within the predetermined area three fields before with the threshold value Th22 for motion field determination. The comparator 53 compares the value $A_{n-2}$ of the accumulated absolute value of the inter-frame difference S3–S1 within the predetermined area two fields before with the threshold value Th12 for still field determination. The comparator 54 compares the value $A_{n-4}$ of the accumulated absolute value of the inter-frame difference S3–S1 within the predetermined area four fields before with the threshold value Th22 for motion field determination. The comparator 55 compares the value $A_{n-3}$ of the accumulated absolute value of the inter-frame difference S3–S1 within the predetermined area three fields before with the threshold value Th12 for still field determination. The comparator 56 compares the value $A_{n-2}$ of the accumulated absolute value of the inter-frame difference S3–S1 within the predetermined area two fields before with the threshold value Th22 for motion field determination.

The NOT circuits 57–59 are connected to each output of the comparators 51, 53, 55 to invert logical output values of the comparators 51, 53, 55. The AND circuit 60 takes a logical AND of respective logical output values of the NOT circuits 57, 58 and comparator 52. The AND circuit 61 takes a logical AND of respective logical output values of the comparators 54, 56 and NOT circuit 59. The OR circuit 62 takes a logical OR of respective logical output values of the AND circuits 60, 61. An output value of the OR circuit 62 is supplied to the OR circuit 63.

The absolute value circuit 64 is supplied with the inter-field difference S2'−S1 from the difference detector circuit 6. The absolute value circuit 64 takes an absolute value of the inter-field difference S2'−S1, and supplies the absolute value to the predetermined area extraction circuit 65. The predetermined area extraction circuit 65 extracts only an absolute value of the inter-field difference S2'−S1 corresponding to the video signal within the predetermined area. The reason for which the predetermined area extraction circuit 65 is provided is similar to the predetermined area extraction circuit 12.

The accumulator 66 accumulates an absolute value of the inter-field difference S2'−S1 extracted from the predetermined area extraction circuit 65 each time a vertical synchronization signal V is generated. The shift circuit 67 is connected to the output of the accumulator 66, and newly holds and outputs an input signal in response to the vertical synchronization signal V. Thus, the shift circuit 67 holds and outputs an output value of the accumulator 66 one field before the output value of the accumulator 66.

The output of the accumulator 66 is connected to one input of each of the comparators 70, 71. The output of the shift circuit 67 is directly connected to one input of the comparator 69, and is connected to the other input of the comparator 70 through the coefficient multiplier 68. The other input of the comparator 69 is supplied with a threshold value Th23 for motion field determination, while the other input of the comparator 71 is supplied with a threshold value Th13 for still field determination.

The comparator 69 compares a value $B_{n-1}$ one field before of the accumulated absolute value of the inter-field difference S2'−S1 within the predetermined area with the threshold value Th23 for motion field determination. The comparator 70 compares a current field value $B_n$ of the accumulated absolute value of the inter-field difference S2'−S1 within the predetermined area with the value $K3 \cdot B_{n-1}$ derived by multiplying the value $B_{n-1}$ one field before with the coefficient K3. The comparator 71 compares the current field value $B_n$ of the accumulated absolute value of the inter-field difference S2'−S1 within the predetermined area with the threshold value Th13 for still field determination.

The NOT circuits 73, 74 are connected to each output of the comparators 70, 71 to invert logical output values of the comparators 70, 71.

The AND circuit 72 takes a logical AND of respective logical output values of the comparators 69–71, and when the result of the logical AND is at high level indicative of "1," this serves as a 2-2 out-of-sequence detection signal. The output value of the AND circuit 72 is further supplied to the OR circuit 63. The AND circuit 75 takes a logical AND of respective logical output values of the comparator 69 and NOT circuits 73, 74, and when the result of the logical AND is at high level indicative of "1," this serves as a 2-2 out-of-sequence detection signal.

The OR circuit 63 takes a logical OR of respective logical output values of the AND circuits 50, 72 and OR circuit 62, and when the result of the logical OR is at high level indicative of "1," this serves as a 2-3 out-of-sequence detection signal.

Figure 6:
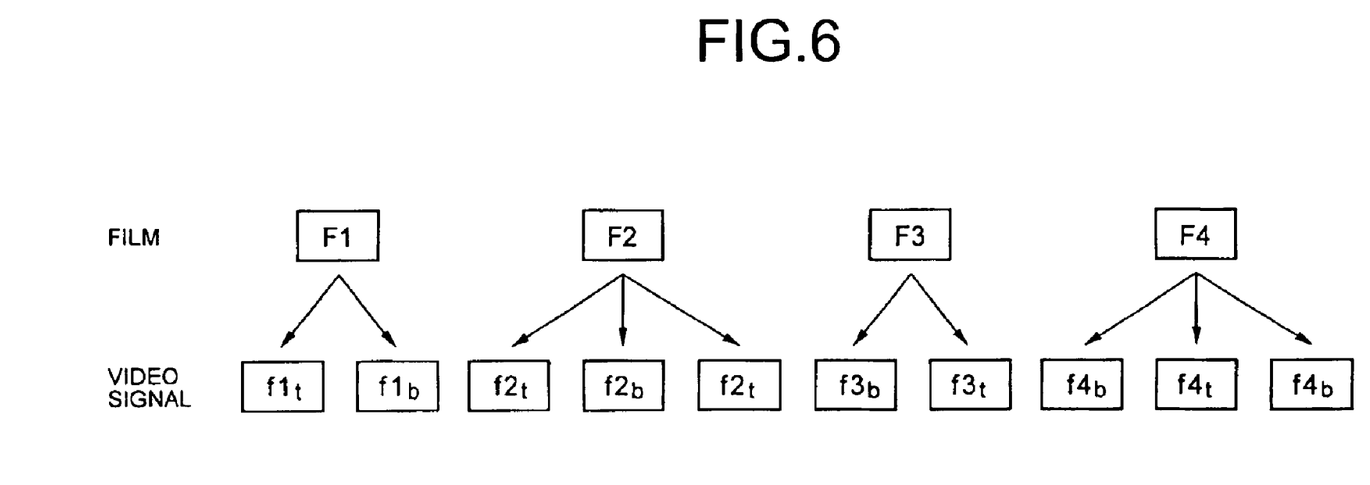
FIG. 6 is a diagram showing a telecine conversion in accordance with the 2-3 pull-down method.

In the telecine conversion method detecting apparatus according to the present invention in the foregoing configuration, description will be first made on a detecting operation for detecting that an input video signal S1 is a video signal converted in accordance with the 2-3 pull-down method. With a video signal converted in accordance with the 2-3 pull-down method, a first frame F1 of a movie film corresponds to a first and a second field $f1_t$, $f1_b$; a second frame F2 to a third to a fifth field $f2_t$, $f2_b$, $f2_t$; a third frame F3 to a sixth and a seventh field $f3_b$, $f3_t$; and a fourth frame F4 to an eighth through tenth field $f4_b$, $f4_t$, $f4_b$, as shown in FIG. 6.

For example, an inter-frame difference S3−S1 detected in the difference detector circuit 5 is reduced once for each fifth field since the third field $f2_t$ is identical in content to the fifth field $f2_t$.

The absolute value circuit 11 takes an absolute value of the inter-frame difference S3−S1 detected by the difference detector circuit 5. The predetermined area extraction circuit 12 extracts from this absolute value an absolute value of the inter-field difference S3−S1 within a predetermined area. Further, the accumulator 13 accumulates the absolute value to derive a current field value $A_n$ of the accumulated absolute value of the inter-frame difference S3−S1 within the predetermined area.

Figure 7:
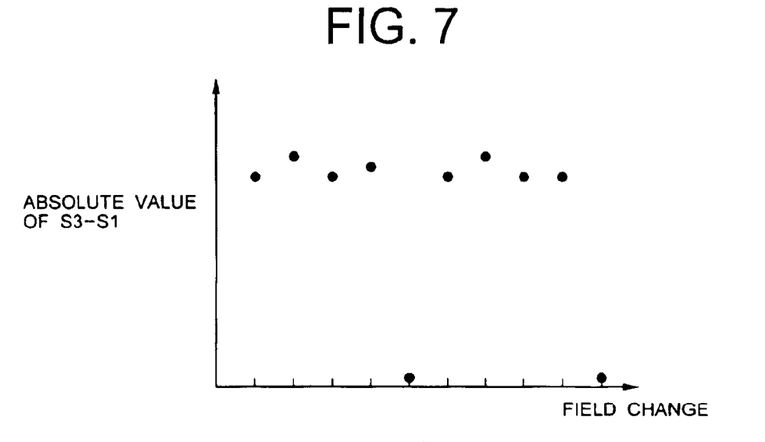
FIG. 7 is a diagram showing a change in an absolute value of an inter-frame difference S3–S1 for each field.

Thus, the accumulated absolute value of the inter-frame difference S3−S1 within the predetermined area changes every field as indicated by black circles in FIG. 7. In other words, a reduction definitely appears every fifth field by accumulating the absolute value of the inter-frame difference S3−S1 within the predetermined area.

By supplying the shift circuits 14–17 with the current field value $A_n$ of the accumulated absolute value of the inter-frame difference S3−S1 within the predetermined area, values (accumulated absolute values of the inter-frame difference S3−S1 within the predetermined area) $A_{n-1}$ one field before to $A_{n-4}$ four fields before are derived from the shift circuits 14–17. Each of the values $A_{n-1}$ one field before to $A_{n-4}$ four fields before is compared with the threshold Th11 for motion field determination in the comparator 22–25. The comparators 22–25 output a high level output at logical "1" when each of the values $A_{n-1}$ one field before to $A_{n-4}$ four fields before is larger than the threshold value Th11 for motion field determination. In this event, the AND circuit 37 generates a high level output at logical "1."

Each of the values $A_{n-1}$ one field before to $A_{n-4}$ four fields before is also multiplied by the coefficient K1 in the multipliers 18–21 to calculate values $K_1 \cdot A_{n-1} - K_1 \cdot A_{n-4}$. The values $K_1 \cdot A_{n-1} - K_1 \cdot A_{n-4}$ are compared with the current field value $A_n$ in the comparators 26–29. The comparators 26–29 generate a low level output at logical "0" when the values $K_1 \cdot A_{n-1} - K_1 \cdot A_{n-4}$ are larger than the current field value $A_n$. Each output level of the comparators 26–29 is inverted by the NOT circuits 32–35, respectively, so that the NOT circuits 32–35 generate high level outputs at logical "1" when the current field value $A_n$ is equal to or smaller than the values $K_1 \cdot A_{n-1} - K_1 \cdot A_{n-4}$. In this event, the AND circuit 38 generates a high level output at logical "1."

Further, the current field value $A_n$ is compared with the threshold value Th21 for still field determination in the comparator 30. The comparator 30 generates a low level output at logical "0" when the current field value $A_n$ is equal to or smaller than the threshold value Th21 for still field determination. Since the output level of the comparator 30 is inverted by the NOT circuit 36, the NOT circuit 36 generates a high level output at logical "1" when the current field value $A_n$ is equal to or smaller than the threshold value Th21 for still field determination.

When the high level output at logical "1" is generated from each of the AND circuits 37, 38 and NOT circuit 36, this corresponds to the aforementioned state in which the current field value $A_n$ becomes smaller than each of the values $A_{n-1}$ one field before to $A_{n-4}$ four fields before once every fifth field. In this event, the AND circuit 39 outputs a high level output indicative of "1" which serves as a 2-3 sequence detection signal and is supplied to the determination circuit 76. In other words, a condition for generating the 2-3 sequence detection signal (condition for determining that an input video signal is a telecine converted video signal generated from a movie film in accordance with the 2-3 pull-down method) is to fully satisfy that each of the values $A_{n-1}$ one field before to $A_{n-4}$ four fields before is larger than the threshold value Th11 for motion field determination; the current field value $A_n$ is equal to or smaller than the values $K_1 \cdot A_{n-1} - K_1 \cdot A_{n-4}$; and the current field value $A_n$ is equal to or smaller than the threshold value Th21 for still field determination.

Next, description will be made on the operation for detecting a 2-3 out-of-sequence where an input video signal S1 is not a video signal converted in accordance with the 2-3 pull-down method.

Each of the values $A_{n-1}$ one field before to $A_{n-4}$ four fields before from the shift circuits 14–17 is multiplied by the coefficient K2 in the multiplier 40–43 to calculate the values $K_2 \cdot A_{n-1} - K_2 \cdot A_{n-4}$. The values $K_2 \cdot A_{n-1} - K_2 \cdot A_{n-4}$ are compared with the current field value $A_n$ from the accumulator 13 in the comparators 44–47. The comparators 44–47 generate high level signals at logical "1" when the current field value $A_n$ is larger than the values $K_2 \cdot A_{n-1} - K_2 \cdot A_{n-4}$. The output signals of the comparators 44–47 are supplied to the OR circuit 49 which takes a logical OR of these signals, so that the OR circuit 49 generates a high level signal at logical "1" when the current field value $A_n$ is larger than at least one of the values $K_2 \cdot A_{n-1} - K_2 \cdot A_{n-4}$.

The current field value $A_n$ is compared with the threshold value Th22 for motion field determination in the comparator 48. The comparator 48 generates a high level signal at logical "1" when the current field value $A_n$ is larger than the threshold value Th22 for motion field determination.

The AND circuit 50 generates a high level signal at logical "1" when the OR circuit 49 and comparator 48 both generate high level signals at logical "1." The high level signal of the AND circuit 50 is supplied to the determination circuit 76 as a 2-3 out-of-sequence detection signal through the OR circuit 63.

In other words, a condition for generating the 2-3 out-of-sequence detection signal is to satisfy that the current field value $A_n$ is larger than at least one of the values $K_2 \cdot A_{n-1} - K_2 \cdot A_{n-4}$; and the current field value $A_n$ is larger than the threshold value Th22 for motion field determination.

Also, each of the values $A_{n-2}$ two fields before and $A_{n-4}$ four fields before from the shift circuits 15, 17 is compared with the threshold value Th12 for still field determination in the comparators 51, 53. The comparators 51, 53 generate low level signals at logical "0" when the values $A_{n-2}$ two fields before and $A_{n-4}$ four fields before are smaller than the threshold value Th12 for still field determination. The output levels of the comparators 51, 53 are inverted by the NOT circuits 57, 58, respectively, so that the NOT circuits 57, 58 each generate a high level output at logical "1" when the values $A_{n-2}$ two fields before and $A_{n-4}$ four fields before are smaller than the threshold value Th12 for still field determination. The respective output signals from the NOT circuits 57, 58 are supplied to the AND circuit 60.

The value $A_{n-3}$ three fields before from the shift circuit 16 is compared with a threshold value Th22 (Th22>Th12) for motion field determination in the comparator 52. The comparator 52 generates a high level signal at logical "1" when the value $A_{n-3}$ three fields before is larger than the threshold value Th22 for motion field determination. The output signal of the comparator 52 is supplied to the AND circuit 60.

The AND circuit 60 generates a high level signal at logical "1" when the NOT circuits 57, 58 and comparator 52 all generate high level signals at logical "1." The high level signal of the AND circuit 60 is supplied to the determination circuit 76 as a 2-3 out-of-sequence detection signal through the OR circuits 62, 63.

Further, the values $A_{n-2}$ two fields before and $A_{n-4}$ four fields before from the shift circuits 15, 17 are compared with the threshold value Th22 for motion field determination in the comparators 54, 56, respectively. The comparators 54, 56 generate high level signals at logical "1" when the values $A_{n-2}$ two fields before and $A_{n-4}$ four fields before are larger than the threshold value Th22 for motion field determination. The respective output signals of the comparators 54, 56 are supplied to the AND circuit 61.

The value $A_{n-3}$ three fields before from the shift circuit 16 is compared with the threshold value Th12 for still field determination in the comparator 55. The comparator 55 generates a low level signal at logical "0" when the value $A_{n-3}$ three fields before is smaller than the threshold value Th12 for still field determination. The output level of the comparator 55 is inverted by the NOT circuit 59, so that the NOT circuit 59 generates a high level output at logical "1" when the value $A_{n-3}$ three fields before is smaller than the threshold value Th12 for still field determination. The output signal from the NOT circuit 59 is supplied to the AND circuit 61.

The AND circuit 61 generates a high level signal at logical "1" when the comparators 54, 56 and NOT circuit 59 all generate high level signals at logical "1." The high level signal of the AND circuit 61 is supplied to the determination circuit 76 as a 2-3 out-of-sequence detection signal through the OR circuits 62, 63.

Another condition for generating the 2-3 out-of-sequence detection signal is to satisfy that the values $A_{n-2}$ two fields before and $A_{n-4}$ four fields before are smaller than the threshold value Th12 for still field determination, and the value $A_{n-3}$ three fields before is larger than the threshold value Th22 for motion field determination, or the values $A_{n-2}$ two fields before and $A_{n-4}$ four fields before are larger than the threshold value Th22 for motion field determination, and the value $A_{n-3}$ three fields before is smaller than the threshold value Th12 for still field determination.

This condition for generation may be to satisfy that the values $A_{n-1}$ one field before and $A_{n-3}$ three fields before are smaller than the threshold value Th12 for still field determination, and the value $A_{n-2}$ two fields before is larger than the threshold value Th22 for motion field determination, or the values $A_{n-1}$ one field before and $A_{n-3}$ three fields before are larger than the threshold value Th22 for motion field determination, and the value $A_{n-2}$ two fields before is smaller than the threshold value Th12 for still field determination.

Figure 8:
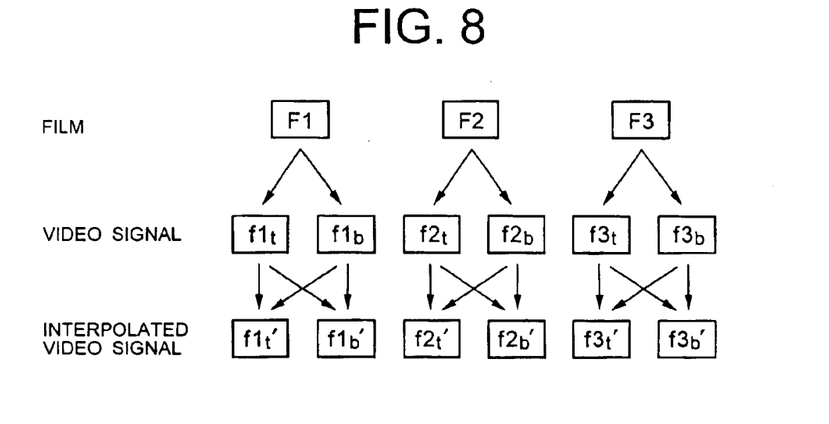
FIG. 8 is a diagram showing a telecine conversion in accordance with the 2-2 pull-down method.

Next, description will be for a detecting operation for detecting that an input video signal S1 is a video signal converted in accordance with the 2-2 pull-down method. With a video signal converted in accordance with the 2-2 pull-down method, a first frame F1 of a movie film corresponds to a first and a second field $f1_t$, $f1_b$; a second frame F2 to a third and a fourth field $f2_t$, $f2_b$, $f2_t$; a third frame F3 to a fifth and a sixth field $f3_t$, $f3_b$, as shown in FIG. 8.

An interpolated field $f1_t'$ is generated for the first and second fields $f1_t$, $f1_b$ by intra-field interpolation processing by the intra-field interpolation circuit 4; an interpolated field $f1_b'$ is generated for the second and third fields $f1_b$, $f2_t$; an interpolated field $f2_t'$ is generated for the third and fourth fields $f2_t$, $f2_b$; and interpolated fields $f2_b'$–$f3_b'$ are subsequently generated in a similar manner.

A$_n$ inter-field difference S2′–S1 detected in the difference detector circuit 6 is reduced once every second fields. The inter-field difference S2′–S1 changes, for example, every field such as $f1_b$–$f1_t'$, $f2_t$–$f1_b'$, $f2_b$–$f2_t'$, $f3_t$–$f2_b'$, $f3_b$–$f3_t'$ in the aforementioned example. $f1_b$–$f1_t'$, $f2_b$–$f2_t'$, and $f3_b$–$f3_t'$ are based on the same frame, whereas $f2_t$–$f1_b'$ and $f3_t$–$f2_b'$ are based on two frames. Thus, $f1_b$–$f1_t'$, $f2_b$–$f2_t'$, and $f3_b$–$f3_t'$ are small in a video image which particularly includes many motions, whereas $f2_t$–$f1_b'$ and $f3_t$–$f2_b'$ become larger, so that the inter-field difference S2′–S1 becomes smaller once every two fields.

The absolute value circuit 64 takes an absolute value of the inter-field difference S2′–S1 detected by the difference detector circuit 6. The predetermined area extraction circuit 65 extracts from this absolute value an absolute value of the inter-field difference S2′–S1 within the predetermined area. Further, the accumulator 66 accumulates the absolute value to derive a current field value B$_n$ of the accumulated absolute value of the inter-frame difference S2′–S1 within the predetermined area.

Figure 9:
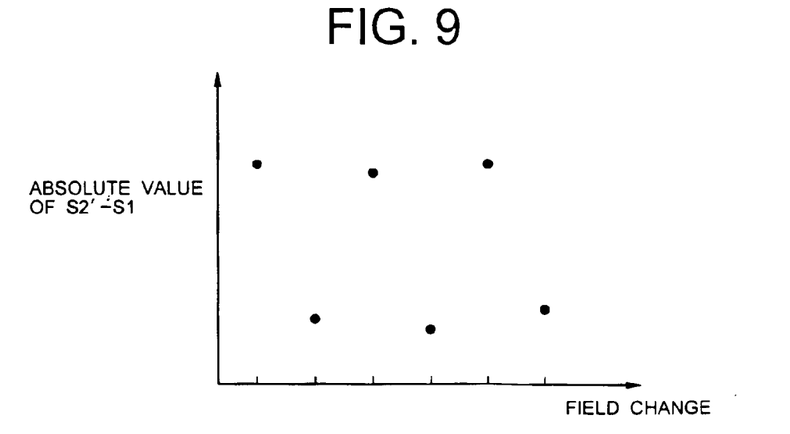
FIG. 9 is a diagram showing a change in an absolute value of an inter-field difference S2'–S1 for each field.

The accumulated absolute value of the inter-frame difference S2′–S1 within the predetermined area changes every field as indicated by black circles in FIG. 9. In other words, a reduction definitely appears once every two fields by accumulating the absolute value of the inter-frame difference S2′–S1 within the predetermined area.

By supplying the shift circuit 67 with the current field value B$_n$ of the accumulated absolute value of the inter-frame difference S2′–S1 within the predetermined area, a value (accumulated absolute value of the inter-frame difference S2′–S1 within the predetermined area) B$_{n-1}$ one field before is derived from the shift circuit 67. The value B$_{n-1}$ one field before is compared with the threshold Th23 for motion field determination in the comparator 69. The comparator 69 generates a high level signal at logical "1" when the values B$_{n-1}$ one field before is larger than the threshold value Th23 for motion field determination, and generates a low level signal at logical "0" when the value B$_{n-1}$ one field before is equal to or smaller than the threshold value Th23 for motion field determination. The output signal of the comparator 69 is supplied to the AND circuits 72, 75.

The value B$_{n-1}$ one field before is also multiplied by the coefficient K3 in the multiplier 68 to calculate a value K$_3$•B$_{n-1}$. The value K$_3$•B$_{n-1}$ is compared with the current field value B$_n$ in the comparator 70. The comparator 70 generates a low level signal at logical "0" when the current field value B$_n$ is equal to or smaller than the value K$_3$•B$_{n-1}$, and generates a high level signal at logical "1" when the current field value B$_n$ is larger than the value K$_3$•B$_{n-1}$. The output level of the comparator 70 is inverted by the NOT circuit 73, so that the NOT circuit 73 generates high level signal at logical "1" when the current field value B$_n$ is equal to or smaller than the value K$_3$•B$_{n-1}$. The output signal of the NOT circuit 73 is supplied to the AND circuit 75.

Further, the current field value B$_n$ is compared with the threshold value Th13 for still field determination in the comparator 71. The comparator 71 generates a low level signal at logical "0" when the current field value B$_n$ is equal to or smaller than the threshold value Th13 for still field determination, and generates a high level signal at logical "1" when the current field value B$_n$ is larger than the threshold value Th13 for still field determination. Since the output level of the comparator 71 is inverted by the NOT circuit 74, the NOT circuit 74 generates a high level output at logical "1" when the current field value B$_n$ is equal to or smaller than the threshold value Th13 for still field determination. The output signal of the NOT circuit 74 is supplied to the AND circuit 75.

When the high level output at logical "1" is generated from each of the comparator 69 and NOT circuits 73, 74, this corresponds to the state as described above, in which the current field value B$_n$ becomes smaller than the values B$_{n-1}$ one field before once every fifth field. In this event, the AND circuit 75 outputs a high level signal indicative of "1" which serves as a 2-2 sequence detection signal and is supplied to the determination circuit 76. In other words, a condition for generating the 2-2 sequence detection signal (condition for determining that an input video signal is a telecine converted video signal generated from a movie film in accordance with the 2-2 pull-down method) is to fully satisfy that the values B$_{n-1}$ one field before is larger than the threshold value Th23 for motion field determination; the current field value B$_n$ is equal to or smaller than the values K$_3$•B$_{n-1}$; and the current field value B$_n$ is equal to or smaller than the threshold value Th13 for still field determination.

On the other hand, the AND circuit 72 is supplied with respective output signals of the comparators 69–70. The AND circuit 72 generates a high level signal at logical "1" when the comparators 69–70 both generate high level signals at logical "1." The high level signal of the AND circuit 72 is supplied to the determination circuit 76 as a 2-2 out-of-sequence detection signal.

In other words, a condition for generating the 2-2 out-of-sequence detection signal is to satisfy that the values B$_{n-1}$ one field before is larger than the threshold value Th22 for motion field determination; the current field value B$_n$ is larger than the values K3•B$_{n-1}$; and the current field value B$_n$ is larger than the threshold value Th13 for still field determination.

The high level signal of the AND circuit 72 is also supplied to the determination circuit 76 as a 2-3 out-of-sequence signal through the OR circuit 63. Thus, a condition for generating the 2-2 out-of-sequence detection signal also constitutes another condition for generating the 2-3 out-of-sequence detection signal.

The determination circuit 76 instructs the sequential scan converter circuit 9 to perform 2-3 reverse conversion processing when the 2-3 sequence detection signal repeats N (a positive integer) times or more within a predetermined period. The determination circuit 76 instructs the sequential scan converter circuit 9 to perform 2-2 reverse conversion processing when the 2-2 sequence detection signal repeats N times or more within a predetermined period.

Figure 10:
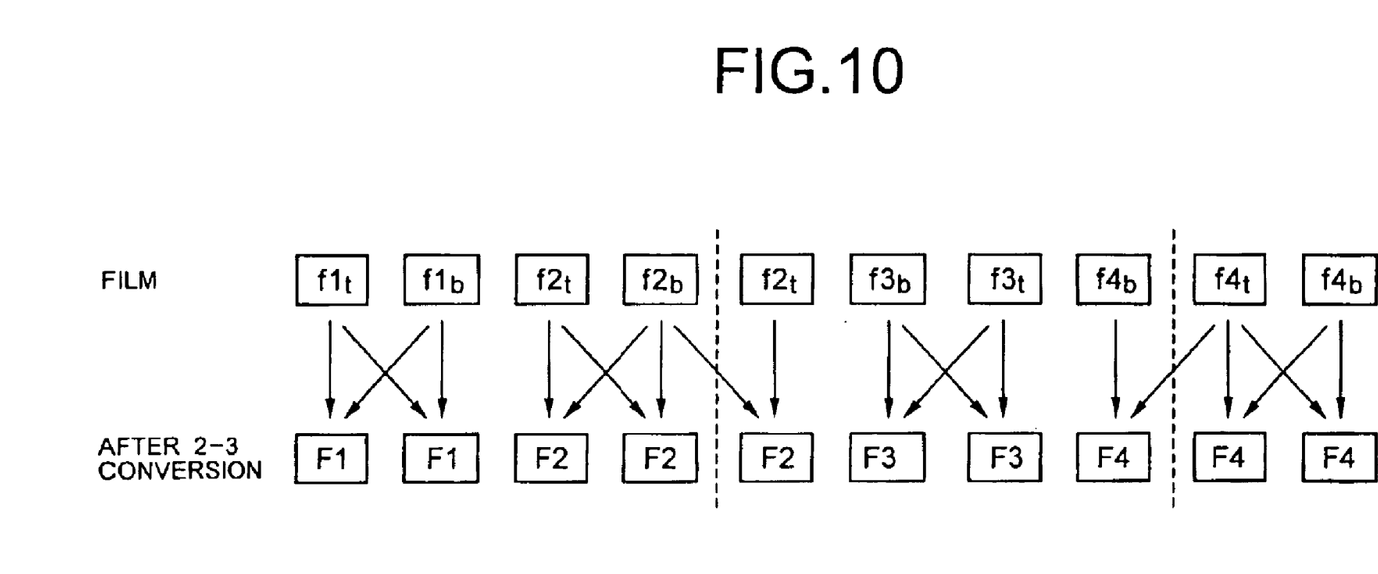
FIG. 10 is a diagram showing 2-3 reverse conversion processing.

When a sequence of fields of the input video signal S1 is in the order of $f1_t$, $f1_b$, $f2_t$, $f2_b$, $f3_t$, $f3_b$, $f4_t$, $f4_b$ as described above, the sequential scan converter circuit 9 converts to a non-interlaced video signal by the 2-3 reverse conversion processing using the video signals S1–S3, as shown in FIG. 10. Specifically, a frame component F1 of the non-interlaced video signal is generated twice successively from $f1_t$ and $f1_b$; a frame component F2 of the non-interlaced video signal is generated twice successively from $f2_t$ and $f2_b$; and the frame component F2 of the non-interlaced video signal is generated only once from $f2_b$ and $f2_t$. Further, a frame component F3 of the non-interlaced video signal is generated twice successively from $f3_b$ and $f3_t$; a frame component F4 of the non-interlaced video signal is generated only once from $f4_b$ and $f4_t$; and the frame component F4 of the non-interlaced video signal is generated twice successively from $f4_t$ and $f4_b$. The non-interlaced video signal formed of these frame components F1, F2, F3, F4 has a horizontal synchronization signal at a frequency twice as high as the horizontal synchronization signal of the input video signal S1, and each of the frame components F1, F2, F3, F4 has a length corresponding to one field period of the input video signal S1.

The frame components F2 and F4 are each formed three times in succession, wherein $f2_t$ and $f4_b$ are determined to avoid intersecting a frame cutting position (position indicated by a broken line in FIG. 10) of the video signal in the formation of the second frame components F2 and F4. In the second frame component F2, $f2_t$ of the preceding field and $f2_b$ of the current field are used, while in the second frame component F4, $f4_t$ of the current field and $f4_b$ of the subsequent field are used.

Figure 11:
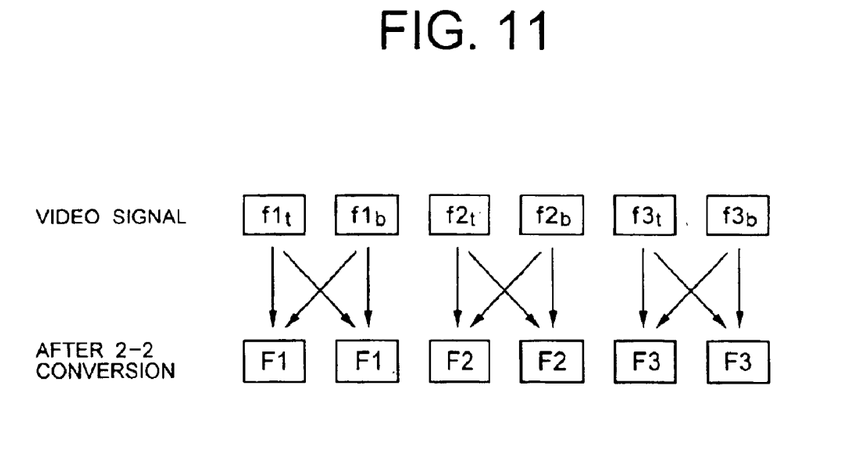
FIG. 11 is a diagram showing 2-2 reverse conversion processing.

The sequential scan converter circuit 9 converts to a non-interlaced video signal by the 2-2 reverse conversion processing using the video signals S1–S3, as shown in FIG. 11. Specifically, when a sequence of fields of the input video signal S1 is in the order of $f1_t$, $f1_b$, $f2_t$, $f2_b$, $f3_t$, $f3_b$ as described above, a frame component F1 of the non-interlaced video signal is generated twice successively from $f1_t$ and $f1_b$; a frame component F2 of the non-interlaced video signal is generated twice successively from $f2_t$ and $f2_b$; and the frame component F3 of the non-interlaced video signal is generated twice successively from $f3_t$ and $f3_b$.

In the foregoing embodiment, the multiplication coefficients K1, K2, K3, threshold values Th11, Th22, Th23 for motion field determination, and threshold values Th12, Th13, Th21 for still field determination may be set to arbitrary values. For example, they may be set to different values in the sequence detection and out-of-sequence detection.

As described above, according to the present invention, a telecine conversion method of an input video signal can be stably and accurately detected.

This application is based on a Japanese Patent Application No. 2001-263818 which is hereby incorporated by reference.

What is claimed is:

1. A telecine conversion method detecting apparatus comprising:

an inter-frame calculator for accumulating an absolute value of an inter-frame difference signal for image components in a predetermined area of each field of an input video signal in each field to calculate an inter-frame difference accumulated value;

an inter-frame holder for holding the inter-frame difference accumulated value of a current field output from said inter-frame calculator to output inter-frame difference accumulated values of four fields preceding the inter-frame difference accumulated value of said current field;

a first detector for detecting that the inter-frame difference accumulated value of said current field is equal to or less than a first still threshold value for still field determination, that each of the inter-frame difference accumulated values of said four preceding fields is equal to or greater than a first motion threshold value for motion field determination that is greater than said first still threshold value, and that the inter-frame difference accumulated value of said current field is less than each corrected value calculated by multiplying each of the inter-frame difference accumulated values of said four preceding fields by a first predetermined coefficient, to generate a first detection signal; and a first determining device for determining in response to said first detection signal that said input video signal is a telecine converted video signal generated from a movie film based on a 2-3 pull-down method.

2. A telecine conversion method detecting apparatus according to claim 1, comprising:

a second detector for detecting that the inter-frame difference accumulated value of said current field is greater than at least one of corrected values calculated by multiplying each of the inter-frame difference accumulated values of said four preceding fields by a second predetermined coefficient, and that the inter-frame difference accumulated value of said current field is greater than a second motion threshold value for motion field determination, to generate a second detection signal;

a third detector for detecting that a first and a third inter-frame difference accumulated values of three successive inter-frame difference accumulated values within the inter-frame difference accumulated values of said four preceding fields are equal to or less than a second still threshold value for still field determination, and a second inter-frame difference accumulated value of the three successive inter-frame difference accumulated values is equal to or greater than said second motion threshold value, or that the first and third inter-frame difference accumulated values of said three inter-frame difference accumulated values are equal to or greater than said second motion threshold value, and the second inter-frame difference accumulated value is equal to or less than said second still threshold value, to generate a third detection signal;

an inter-field calculator for performing intra-field interpolation processing every field of a video signal one field before an input video signal to generate an interpolated video signal, and accumulating an absolute value of an inter-field difference signal every field for image components within a predetermined region in accordance with a difference between said input video signal and said interpolated video signal to calculate an inter-field difference accumulated value;

an inter-field holder for holding an inter-field difference accumulated value of a current field output from said inter-field calculator to output an inter-field difference accumulated value of a previous field preceding the inter-field difference accumulated value of said current field;

a fourth detector for detecting that the inter-frame difference accumulated value of said previous field is greater than said second motion threshold value, that the inter-frame difference accumulated value of said current field is greater than said second still threshold value, and that the inter-frame difference accumulated value of said current field is greater than a corrected value calculated by multiplying the inter-field difference accumulated value of said previous field by a second predetermined coefficient, to generate a fourth detection signal; and a second determining device for determining that said input video signal is a video signal other than a telecine converted video signal generated in accordance with said 2-3 pull-down method in response to one of said second through fourth detection signals.

3. A telecine conversion method detecting apparatus comprising:

an inter-field calculator for performing intra-field interpolation processing every field of a video signal one field before an input video signal to generate an interpolated video signal, and accumulating an absolute value of an inter-field difference signal every field for image components within a predetermined area in accordance with a difference between said input video signal and said interpolated video signal to calculate an inter-field difference accumulated value;

an inter-field holder for holding an inter-field difference accumulated value of a current field output from said inter-field calculator to output an inter-field difference accumulated value of a previous field preceding the inter-field difference accumulated value of said current field;

a first detector for detecting that the inter-frame difference accumulated value of said previous field is equal to or greater than a motion threshold value for motion field determination, that the inter-frame difference accumulated value of said current field is equal to or less than a still threshold value for still field determination, and that the inter-frame difference accumulated value of said current field is less than a corrected value calculated by multiplying the inter-field difference accumulated value of said previous field by a predetermined coefficient, to generate a first detection signal; and a first determining device for determining that said input video signal is a telecine converted video signal generated from a movie film based on a 2-2 pull-down method in response to said first detection signal.

4. A telecine conversion method detecting apparatus according to claim 3, comprising:

a second detector for detecting that the inter-frame difference accumulated value of said previous field is greater than said motion threshold value, that the inter-frame difference accumulated value of said current field is greater than said still threshold value, and that the inter-frame difference accumulated value of said current field is greater than a corrected value calculated by multiplying the inter-field difference accumulated value of said previous field by said predetermined coefficient, to generate a second detection signal; and a second determining device for determining that said input video signal is a signal other than a telecine converted video signal generated in accordance with said 2-2 pull-down method in response to said second detection signal.

* * * * *